United States Patent Office 3,358,527
Patented Dec. 19, 1967

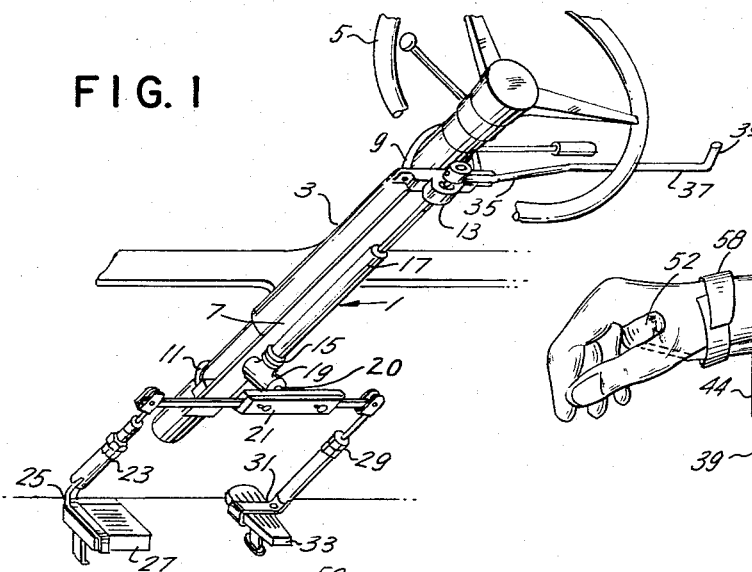
FIG. 1
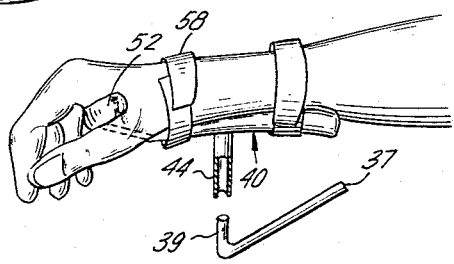
FIG. 4
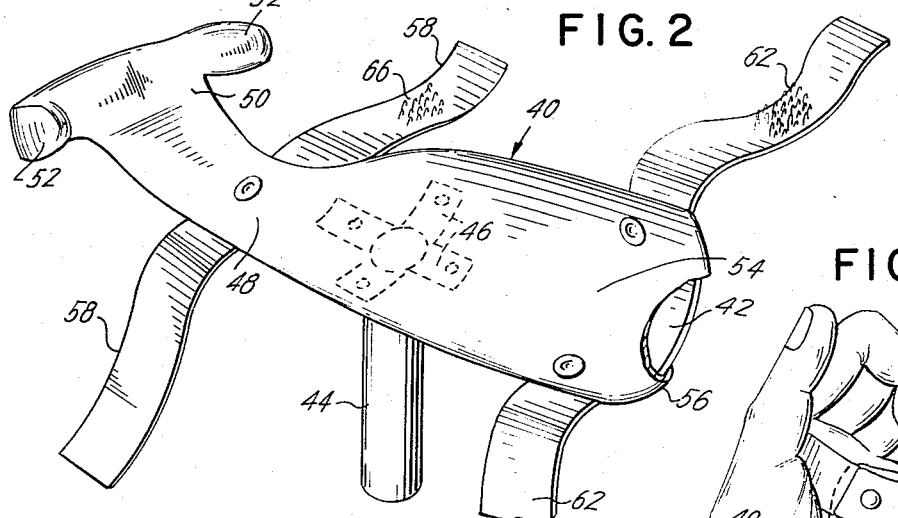
FIG. 2
FIG. 3
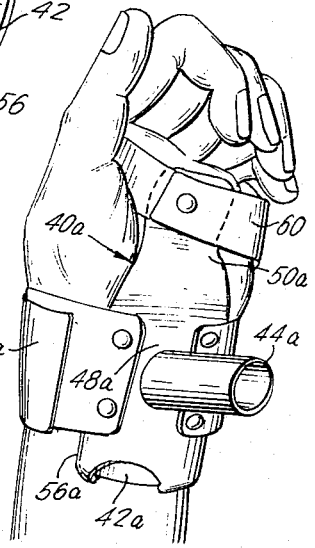
FIG. 5

3,358,527
WRIST ATTACHMENT AND MANUAL CONTROL
FOR MOTOR VEHICLES
Louise Lake, New York, N.Y., and George H. Mortimer, Upper Montclair, N.J., assignors, by direct and mesne assignments, to Louise Enterprises, Inc., Mount Kisko, N.Y., a corporation of New York
Filed Sept. 7, 1965, Ser. No. 485,413
12 Claims. (Cl. 74—484)

The present invention relates to a wrist attachment to operate a manual control for a motor vehicle having a steering column and a steering wheel which is adapted to the abilities of a physically handicapped operator, and to the combination of a manual control, a wrist attachment and means to operatively and removably connect the wrist attachment to an operating lever of the manual control which oscillates about an axis generally parallel to the axis of the steering column of the motor vehicle. The invention is particularly advantageous for the use of a quadriplegic who has weakness in the fingers or hands but who has sufficient power in the upper extremities to push and pull the operating lever adjacent to the steering wheel.

The invention will be described in conjunction with the drawing in which:

FIG. 1 is an isometric view of a manual control which forms one element of the combination of the invention secured to the steering column of a motor vehicle;

FIG. 2 shows an isometric view of the upper side of a wrist attachment forming another element of the combination of the invention;

FIG. 3 is a bottom view of the wrist attachment of FIG. 2;

FIG. 4 is a side view of the wrist attachment of FIGS. 2 and 3 removably secured to the right arm of an operator showing how the operative connection of the wrist attachment is made to the operating lever of the manual control of FIG. 1; and FIG. 5 is an isometric view of another embodiment of the wrist attachment removably secured to the left arm of an operator as seen from below.

The present invention in its most comprehensive embodiment includes the combination of three elements, viz., (1) a manual control for a motor vehicle provided with a steering wheel and which has an operating lever movable generally parallel and adjacent to the steering wheel, (2) a wrist attachment to be removably secured to the lower forearm of an operator, and (3) means to connect the wrist attachment removably and operatively with the operating lever. The invention also includes (1) the improvement in the manual control element which adapts it for use with an arm or wrist attachment and (2) the wrist attachment per se as sub-combinations. The wrist attachment is useful independently of the manual control, e.g., for steering a motor vehicle. The term "wrist" as used herein to qualify the word "attachment" is not to be given a restricted construction to the joint only between the arm and hand but more generally to the region of the wrist and including the lower forearm and part of the hand.

Referring now more particularly to FIG. 1, a manual control 1 is removably secured to the steering column 3 of a motor vehicle (only fragmentarily shown) which is provided with a steering wheel 5. The control 1 comprises a frame 7, an upper clamp 9 and a lower clamp 11 which are adapted to hold the control removably but securely to the steering column as illustrated.

An upper bearing 13 and a lower bearing 15 are secured to the frame 7 to provide journals for a drive shaft 17 which is operatively connected at its lower end to a gear box 19 in which bevel gears (not shown) are housed and to a stub shaft 20 to which a rocker bar 21 is secured so that rotation of the drive shaft 17 about its axis is translated into up and down movements of the rocker arm, depending on the direction of rotation of the shaft 17. To the left end of the rocker bar 21, as seen in FIG. 1, is pivotally mounted a brake push rod 23 which has a pivotal connection to a brake clamp 25 removably secured to the brake pedal 27 of the motor vehicle. To the right end of the rocker arm 21 is pivotally mounted an accelerator push rod 29 which has a pivotal connection to an accelerator clamp 31 removably secured to the accelerator pedal 33 of the motor vehicle.

At the upper end of the drive shaft an operating or control lever 35 is removably but non-rotatably secured to the drive shaft 7. In FIG. 1 it is shown extending to the right of the drive shaft with its free end portion 37 extending adjacent to and a short distance beyond the periphery of the steering wheel 5. It will be seen that the movement of the operating lever about the axis of the shaft 7 will be generally parallel to the periphery of the steering wheel, i.e., it will follow rather closely the under surface of the steering wheel because the shaft 7 is practically parallel to the axis of the steering column 3 and also the circumference of the wheel because the axis of shaft 7 is only a short distance offset from the axis of wheel 5.

The operation of the manual control is as follows: to depress the accelerator the operator pushes the free end of the operating lever away from himself, i.e., toward the front of the motor vehicle. This depresses the right end of the rocker arm 21, the push rod 29, the clamp 31 and the pedal 33. Movement of the control lever toward the operator first brings the accelerator 33 back to the neutral position and then depresses the brake pedal 27 through the push rod 23. In order not to raise the accelerator above its normal position when the brake is applied or the brake above its normal position when the accelerator is depressed the push rods have a lost motion connection built into them. The manual control per se is not part of the present invention but is the subject of our prior application for patent Ser. No. 444,650 filed Apr. 1, 1965. As more fully disclosed therein the manual control lever 35 can be turned to the left side for left hand rather than right hand operation and means can be provided to operate the brake by forward or rearward movement from either side.

The novel feature of the manual control which is a feature of the present invention is the provision of means on the free end of the manual control lever 35 to cooperate with a wrist attachment, now to be described, to form an operative connection between the attachment and the manual control. In the embodiment shown in the drawing this means comprises an upturned end 39 at the free end of the lever 35.

Referring now more particularly to FIGS. 2 and 3, the wrist attachment 40 comprises a plate 42 provided with means 44 to connect it to the operating lever 35 of the manual control 1. In the form illustrated the connector 44 is a tube having its end split to provide a plurality of arms 46 which are riveted or otherwise secured to the plate 42. The plate 42 comprises a wrist portion 48, a raised hand support portion 50 and a U-shaped end piece into which the palm of the hand fits, as seen in FIG. 4. The plate may also be provided with an extension 54 of the wrist portion 48 to underlie the forearm of the operator to which it may be conformed to fit. For comfort the plate 42 may be covered with any suitable covering 56, e.g., soft leather, mole skin fabric, and the like which have low heat conductivity compared to metal and may be adhesively secured to the plate.

FIG. 5 shows another embodiment of the wrist attachment 40a which comprises a plate 42a, a connector 44a, a wrist portion 48a and a raised hand portion 50a. A covering of the same type 56a may also be provided for comfort of the operator so that the hand and lower forearm do not come in direct contact with the metal, or other material, of which the plate is made.

The plate 42 or 42a is adapted to be secured to the wrist of a person who is to operate the motor vehicle adjacent to the wrist. For this purpose a strap 58 is fastened to the wrist portion of plate 42 and a like strap 58a is fastened to the wrist portion 48a of plate 42a. In the embodiment of FIG. 5 a hand strap 60 is secured to the raised portion 50a so as to encircle the palm of the hand. In the embodiment of FIGS. 2 and 3 the U-shaped end piece 52 serves this function adequately but to give further stability to the attachment on the lower forearm of the operator it is preferred to provide a strap 62 to encircle the forearm. Any suitable straps may be used that provide adjustable securing means but a preferred strap material is Velcro which has on one piece a multiplicity of loops 64 and on the other a multiplicity of hooks 66 which only need to be pressed together to form a very secure connection between them. In FIGS. 2 and 3 only a portion of the strap area has been covered with the loops 64 and the hooks 66 but it will be understood by those skilled in the art that they cover the entire surfaces.

FIG. 4 shows how the wrist attachment and the operating lever cooperate to form the means for operatively connecting the arm or wrist attachment to the operating lever with the upturned end 39 simply sliding into the recess in the tube 44. The location of the parts is such that the hand of the arm to which the attachment is secured may rest on the steering wheel 5 during driving. The motion for operating the manual control is simply to push the arm away from the operator to actuate the accelerator and to pull the arm toward the operator to apply the brake. The operative connection between the wrist attachment and the operating lever is readily broken simply by lifting the arm and separating the tube from the upturned end. As long as the two are operatively connected together the weight of the arm can be supported by the operating lever and the weight of the arm assures the maintenance of the connection.

The arm attachment can also be used for steering a motor vehicle provided with a steering wheel simply by mounting a fixture on the steering wheel opposite the position of the upturned end 39 which has a similar upwardly extending pin to be received in the tube of a second arm attachment for the other arm of the operator. Thus a person who has no use of his hands can safely drive an automobile or other motor vehicle provided he has the ability to move his arms to push and pull as described above.

It is obvious that the particular mechanism of the hand control is immaterial provided only that the operating lever moves generally parallel to the steering wheel and provides support for the arm to which the attachment is secured. Modifications in the design of the parts can also be made without departing from the spirit and scope of the invention as set forth in the following claims.

Having thus described the invention, what is claimed is:

1. A manual control for a motor vehicle having a steering wheel comprising in combination:
  (a) a manual control adapted to be secured to a motor vehicle having an operating lever movable generally parallel to and below the steering wheel, said lever having an upturned end movable adjacent to and beyond the periphery of said steering wheel,
  (b) a wrist attachment adapted to be removably secured to the arm of an operator, and
  (c) means to removably and operatively connect the wrist attachment to the upturned end of said operating lever.

2. A manual control for a motor vehicle having a steering column and steering wheel comprising:
  (a) means including a drive shaft adapted to be secured to the motor vehicle with the drive shaft adjacent and substantially parallel to the steering column to depress alternately the brake and accelecator when the drive shaft is oscillated,
  (b) an operating lever having one end non-rotatably secured to said drive shaft and the free end portion adapted when installed to a motor vehicle to extend adjacent to and a short distance beyond the periphery of the steering wheel whereby the free end moves generally parallel to the steering wheel as the lever is operated to control the motor vehicle,
  (c) a plate adapted to be secured to the arm of an operator adjacent to the wrist, and
  (d) means on said plate adapted to be operatively connected to said free end of the operating lever.

3. A manual control for a motor vehicle as set forth in claim 2 in which said free end extends upwardly and the connecting means comprises a tube secured to said plate adapted to slide over the upturned end of said operating lever.

4. A wrist attachment for an operator of a motor vehicle comprising:
  (a) a plate,
  (b) a tube connector secured to and extending transversely from said plate, and
  (c) means for removably securing the plate to the wrist of the operator.

5. A wrist attachment as set forth in claim 4 in which said plate is metal and is provided with a covering of soft, flexible material of low heat conductivity compared to metal.

6. A wrist attachment as set forth in claim 4 in which the removable securing means includes a strap secured to the wrist portion and another strap secured to the raised end portion.

7. A wrist attachment as set forth in claim 6 in which said straps comprise surfaces covered with hooks and loops on opposite surfaces to removably hold them together.

8. A wrist attachment for an operator of a motor vehicle comprising:
  (a) a plate having a wrist portion and a raised end portion to support the palm of the operator's hand,
  (b) a tube connector secured to and extending transversely from said plate, and
  (c) means for removably securing the plate to the lower forearm of the operator.

9. A wrist attachment as set forth in claim 8 in which said raised portion includes a U-shaped end piece adapted to receive the palm of the operator's hand adjacent to the knuckles.

10. A wrist attachment as set forth in claim 9 in which the wrist portion is adapted to extend at least part way up the forearm of the operator and is curved to fit the arm.

11. A wrist attachment as set forth in claim 9 in which one strap is secured to said plate to surround the wrist and a second strap is secured to said plate to surround the lower forearm.

12. The improvement in a manual control for a motor vehicle having an operating lever movable generally parallel to and below the steering wheel thereof which comprises an upwardly extending free end of the operating lever movable adjacent to and beyond the periphery of the steering wheel adapting it to make operative connection with a wrist attachment.

References Cited

UNITED STATES PATENTS

| | | | |
|---|---|---|---|
| 578,852 | 3/1897 | Barke | 74—543 X |
| 1,551,222 | 8/1925 | Smith | 74—544 |
| 1,711,447 | 4/1929 | Colanduoni | 3—12.8 X |
| 1,790,381 | 1/1931 | Keller | 128—77 X |
| 2,851,901 | 9/1958 | Kartier et al. | 74—557 |
| 2,889,160 | 6/1959 | Nelson | 3—12.8 X |
| 3,020,908 | 2/1962 | Daniels et al. | 128—77 X |
| 3,089,560 | 5/1963 | Priest. | |
| 3,192,589 | 7/1965 | Pearson. | |

FOREIGN PATENTS

| | | |
|---|---|---|
| 104,295 | 3/1917 | Great Britain. |

OTHER REFERENCES

Development of Useful Function in the Severely Paralyzed Hand by V. L. Nickel, M.D. et al., page 936, vol. 45-A, No. 5, July 1963, Jour. Bone and Joint Surg.

FRED C. MATTERN, JR., *Primary Examiner.*

C. F. GREEN, *Assistant Examiner.*

Dedication 3,358,527.—*Louise Lake*, New York, N.Y. and *George H. Mortimer*, Upper Montclair, N.J. WRIST ATTACHMENT AND MANUAL CONTROL FOR MOTOR VEHICLES. Patent dated Dec. 19, 1967. Dedication filed July 28, 1980, by the assignee, *Louise Lake Enterprises, Inc.*

Hereby dedicates to the Public the entire term of said patent.

[*Official Gazette October 28, 1980.*]